March 27, 1962  P. C. DOOLEY  3,026,918
LEVEL ATTACHMENT FOR CHAIN SAW
Filed Dec. 29, 1958

INVENTOR.
PHILIP C. DOOLEY
BY
BUCKHORN, CHEATHAM & BLORE
ATTORNEYS

United States Patent Office 3,026,918
Patented Mar. 27, 1962

3,026,918
LEVEL ATTACHMENT FOR CHAIN SAW
Philip C. Dooley, 1426 SE. 84 Ave., Portland, Oreg.
Filed Dec. 29, 1958, Ser. No. 783,372
4 Claims. (Cl. 143—32)

This invention relates to attachments for chain saws and particularly to attachments permitting the saw to cut off work at a predetermined place or level.

For convenience, the invention will be explained in connection with cutting off wooden piling, but the invention is obviously not intended to be restricted to this use and has other uses.

After piling is driven into place, the piling must be cut off so that the top surfaces of the piles lie at a predetermined level. Heretofore, the most conventional way of accomplishing this has been to nail stringers to the piling at the predetermined level and use a hand saw to cut off a pile flush with the upper surfaces of the stringers. The stringers thus act as guide members for the saw. Attempts have also been made to use chain saws, but this has not been satisfactory, because there is no way to guide the saw and thus the level of a pile top is at the level at which the saw is held. Where attempts have been made to use stringers as a guide, this has proved ineffective since the chain saw merely cuts into the stringers.

It is a main object of the present invention to provide an attachment for a chain saw permitting a piece of work to be cut off level with a guide member or guide members in a rapid and accurate manner.

A more specific object of the invention is to provide such an attachment which is secured to the saw bar of a chain saw, and which requires only minor modification of the saw bar to effect the securement, and which minor modifications may be made by the user.

A more particular object of the invention is to provide an attachment in the form of a pair of spacer plate means securable to the saw bar of a chain saw to engage spaced guide members to hold the cutter teeth of the saw chain in position to cut off the work level or flush with the guide members.

Various other objects of the invention will be apparent from the following description taken in connection with the accompanying drawings wherein.

Figure 1:
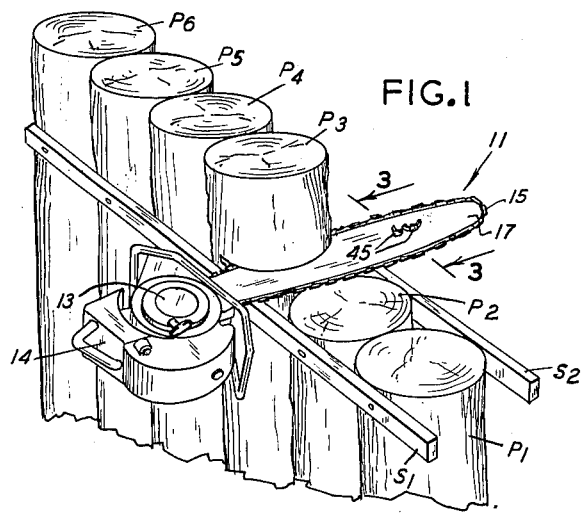
FIG. 1 is a perspective view showing a chain saw equipped with an attachment of the present invention cutting off piling flush with a pair of stringers.

Referring to the drawings, there is a chain saw generally indicated by the reference numeral 11, the chain saw being of conventional construction with minor modifications to be referred to hereinafter. The chain saw is shown cutting off the tops of piling including piles P1, P2, P3, P4, P5 and P6 level with the upper surfaces of stringers S1 and S2 nailed or otherwise secured to the pile at a desired level. The saw includes a motor 13 mounted on a frame 14 and driving a chain 15 which is guided by a saw bar 17. The inboard end or base end of the saw bar conventionally is provided with a slot 19, as best shown in FIG. 2, to receive a pair of bolts 21 to secure the bar to a flange or pad 22 which is a part of or is secured to the frame 14 of the saw.

Figure 3:
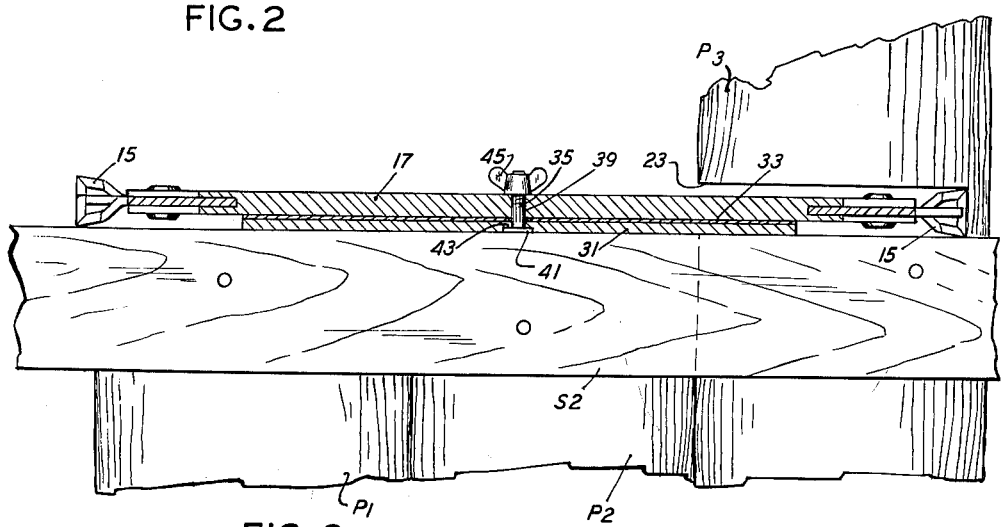
FIG. 3 is an enlarged, sectional view taken along line 3—3 of FIG. 1, showing the relationship of the chain saw and the work.

As is evident from FIG. 3, the bar 17 is thinner than the vertical thickness of the saw chain 15, as the parts are shown in FIG. 3, to permit the saw bar to freely pass into the kerf 23 cut by the saw chain in the work.

Figure 2:
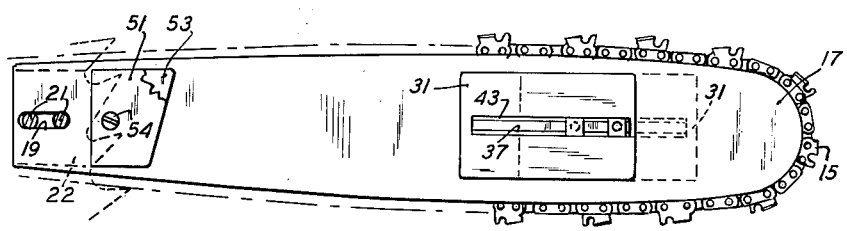
FIG. 2 is a view of the opposite side of the saw bar than shown in FIG. 1, the view being taken on an enlarged scale and more clearly showing the attachment of the subject invention.

The attachment of the present invention includes a pair of plate means, the first including a main, flat, oblong, generally rectangular guide plate 31, which is shown in FIGS. 2 and 3, and a shim plate 33 of similar shape shown in FIG. 3. The shim plate, however, is considerably thinner than the guide plate. The plate and its shim are secured to the bar 17 by a pair of bolts 35. These bolts pass through a pair of matching elongated slots 37 formed in the plate and shim and also through a pair of holes 39 formed in the bar 17. The bar is not conventionally provided with these holes 39 and they therefore must be drilled therein by the user. It is pointed out that the plate 31 and its shim are located near the outboard end of the guide bar.

The bolts have flat heads 41 slidably fitting within countersunk portion 43 of the slot 37 of the plate 31 so that the heads are flush with or disposed in countersunk relation with respect to the bottom or exposed surface of the plate 31. Wing nuts 45 are threaded on the protruding ends of the bolts 35 to hold the plate 31 and its shim firmly against the saw bar.

The combined thickness of plate 31 and its shim is equal to the distance the saw chain projects downwardly beyond the lower face of the saw bar, as the parts are shown in FIG. 3. The plate 31 rests on the stringer S2 as is apparent from FIGS. 1 and 3.

The slotted connection between the saw bar and the plate 31 and its shim provides for longitudinal adjustment of the plate and its shim relative to the saw bar for a purpose to be described hereinafter.

The other plate means comprises a smaller plate 51 and a shim 53 of similar shape secured by a bolt 54 to the inboard end of the saw bar on the underside thereof as the bar is shown in FIG. 2. The bolt passes through a hole formed in the saw bar, the hole being located so that a straight edge of the plate 51 and a similar edge of the shim 53 abut against a straight edge of the flange 22 to prevent the plate 51 and the shim 53 from turning relative to the saw bar. This would be undesirable since the plate and shim would then come into engagement with the saw chain.

The combined thickness of the plate 51 and its shim is the same as the combined thickness of the plate 31 and its shim. The plate 51 is designed to engage the stringer S1 closest to the motor housing to support the inboard end of the saw bar on the stringer with the saw chain teeth in position to cut off piling at the level of the upper surfaces of the stringer.

To enable the attachment to be used with different sizes of piling or work, the outboard plate and its shim may be shifted relative to the saw bar upon loosening of the nut 45. It is apparent from FIG. 2 that the bolts 35 are spaced apart a distance only a minor fraction of the length of the slots 37. Thus, while the two bolts prevent turning of the outboard plate and its shim relative to the saw bar, they permit substantial adjustment of the outboard plate and its shim relative to the saw bar to adjust the attachment for engagement with differently spaced guide means or stringers. Thus different size work may be readily accommodated.

With the attachment of the present invention, the piling can be cut off flush with the stringers because the two plate means serve as guides to support the saw chain in position to cut off the piling even with the upper surfaces of the stringers. The plate means also prevent the saw from digging into the work or stringers, because the plates will cause a binding action of the saw within its kerf if the saw bar is not held parallel to the stringers or other guide members.

While the attachment is shown on a saw used to cut off piling, it is evident that a saw equipped with the attachment may be used for a wide variety of purposes in cutting off work level or flush with certain guide surfaces or members.

It is pointed out that the attachment of the present invention can be secured to any chain saw by the provision of two holes for the outboard plate means and a single bale for the inboard plate means. It is further pointed out that the attachment may be readily removed from the saw bar to permit the saw bar to be used in a normal fashion. It is also pointed out that the attachment of the present invention does not require dismantling or disassembly of the saw, and to the contrary the attachment may be secured to the saw without any disassembly being required. In securing the plate 51 and its shim 53 in position, the bolts 21 are loosened an extent to allow the plate and its shim to be slipped into place and then the bolt 54 is inserted through the appropriate hole provided in the plate and the appropriate hole provided in the shim. The bolts 21 and 54 are then tightened.

After the saw chain has been sharpened a number of times, its width may decrease. In order to provide for flush cutting action with this decreased width, the thickness of the shims 33 and 53 may be varied by substituting thinner shims for these.

The slot 19 in certain saw bars may extend forwardly sufficiently to allow the bolt 54 to pass through the slot rather than providing a special hole for the bolt.

Having described the invention in what is considered to be the preferred embodiment thereof, it is desired that it be understood that the invention is not to be limited other than by the provisions of the following claims.

I claim:

1. An attachment for a chain saw of the type having a motor driving a saw chain guided for movement by a one piece flat elongated saw bar said attachment comprising plate means disposed against one side of said bar, means for immovably securing said plate means to said bar, said plate means having a thickness such that the saw chain just clears the guide means of a workpiece, thus providing for cutting off work flush with guide means engaged by said plate means said plate means having a dimension in the direction of the width of said bar less than such width and a dimension in the direction of the length of said bar less than such length to facilitate application of said plate means to said bar without requiring removal of the saw chain from said blade.

2. An attachment as set forth in claim 1 in which there is a second plate means secured to said saw bar on said one side in spaced relation to the first named plate means, said second plate means having a thickness substantially the same as the first named plate means facilitating support of said saw bar on spaced guides that flank work to be cut.

3. An attachment as set forth in claim 1 in which the plate means includes a guide plate and a separate shim disposed between the guide plate and the saw bar.

4. In combination with a chain saw of the type having a flat single piece elongated saw bar, a saw chain on said bar having teeth projecting laterally of the bar so that the kerf cut by the teeth is substantially greater than the thickness of said bar, an attachment for said bar comprising plate means for slidably engaging a guide on work to be cut and being disposed against one side of said bar, said plate means and bar having openings formed therethrough, means extending through said openings for securing said plate means to said bar, said plate means having a thickness sufficient that when said plate means is in contact with a guide or a workpiece, the teeth will just clear said guide and the work will be cut off flush with said guide, said plate means having a dimension in the direction of the width of said bar less than such width and a dimension in the direction of the length of said bar less than such length to facilitate application of said plate means to said bar without requiring removal of the saw chain from said bar.

References Cited in the file of this patent

UNITED STATES PATENTS

| | | |
|---|---|---|
| 1,221,401 | Wilhelm et al. | Apr. 3, 1917 |
| 1,861,162 | Quist | May 31, 1932 |
| 2,779,359 | Koski | Jan. 29, 1957 |

FOREIGN PATENTS

| | | |
|---|---|---|
| 740,965 | Germany | Nov. 1, 1943 |